(12) United States Patent
Lim et al.

(10) Patent No.: US 9,360,239 B2
(45) Date of Patent: Jun. 7, 2016

(54) REFRIGERATOR

(71) Applicant: SAMSUNG ELECTRONICS CO., LTD., Suwon-si, Gyeonggi-do (KR)

(72) Inventors: Jae Hoon Lim, Suwon-si (KR); Jae Koog An, Gwangju (KR); Jong Eun Chae, Gwangju (KR); Sang Min Park, Gwangju (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/752,248

(22) Filed: Jun. 26, 2015

(65) Prior Publication Data

US 2015/0300722 A1    Oct. 22, 2015

Related U.S. Application Data

(63) Continuation of application No. 14/570,905, filed on Dec. 15, 2014, which is a continuation of application No. 12/659,461, filed on Mar. 9, 2010, now Pat. No. 8,938,985.

(30) Foreign Application Priority Data

Mar. 10, 2009  (KR) .................. 10-2009-0020227
Feb. 25, 2010  (KR) .................. 10-2010-0016952

(51) Int. Cl.
*F25D 11/00*    (2006.01)
*F25B 11/00*    (2006.01)
*F25D 23/12*    (2006.01)
(Continued)

(52) U.S. Cl.
CPC .............. *F25B 11/00* (2013.01); *B01D 35/027* (2013.01); *B01D 35/30* (2013.01); *C02F 1/001* (2013.01); *F25D 23/021* (2013.01); *F25D 23/126* (2013.01); *F25D 25/025* (2013.01); *F25D 31/002* (2013.01); *B01D 2201/302* (2013.01); *B01D 2201/4015* (2013.01);
(Continued)

(58) Field of Classification Search
CPC ......... F25D 23/126; F25D 23/12; F25D 3/02; F25D 25/025; F25D 11/00; F25D 2323/121; F25D 2323/122; B01D 35/027; B01D 2201/4023; B01D 2201/302; C02F 2307/12
See application file for complete search history.

(56) References Cited

U.S. PATENT DOCUMENTS 3,982,406 A    9/1976    Hanson et al.
4,739,629 A    4/1988    True
(Continued)

FOREIGN PATENT DOCUMENTS

JP    2006-010215    1/2006
KR    2007-0016554    7/2004
(Continued)

OTHER PUBLICATIONS

Notice of Allowance issued Sep. 12, 2014 in co-pending U.S. Appl. No. 12/659,461, 11 pages.
(Continued)

*Primary Examiner* — Emmanuel Duke
(74) *Attorney, Agent, or Firm* — Staas & Halsey LLP

(57) ABSTRACT

Disclosed herein is a refrigerator. In the refrigerator, a water purifying unit including a filter unit to purify water supplied from a water supply source is arranged adjacent to a drawer type storage container in an otherwise useless space of a storage compartment.

10 Claims, 11 Drawing Sheets

(51) Int. Cl.
   *F25D 25/02* (2006.01)
   *F25D 23/02* (2006.01)
   *F25D 31/00* (2006.01)
   *B01D 35/027* (2006.01)
   *B01D 35/30* (2006.01)
   *C02F 1/00* (2006.01)

(52) U.S. Cl.
   CPC .... *B01D 2201/4023* (2013.01); *C02F 2307/12* (2013.01); *F25D 2323/121* (2013.01); *F25D 2323/122* (2013.01)

(56) References Cited

U.S. PATENT DOCUMENTS

| | | | |
|---|---|---|---|
| 5,135,645 | A | 8/1992 | Sklenak et al. |
| 5,601,710 | A * | 2/1997 | Yoon .................. B01D 29/114 210/232 |
| 6,532,758 | B2 * | 3/2003 | DuHack ................ F16K 31/404 137/883 |
| 6,622,509 | B2 | 9/2003 | Stich et al. |
| 7,056,435 | B2 | 6/2006 | Jenkins et al. |
| 7,216,502 | B2 | 5/2007 | Jeong et al. |
| 7,658,212 | B2 | 2/2010 | Meuleners et al. |
| 2003/0024860 | A1 * | 2/2003 | Fritze .................. B01D 35/143 210/97 |
| 2004/0007516 | A1 * | 1/2004 | Fritze .................. F25D 23/126 210/263 |
| 2004/0188466 | A1 | 9/2004 | Choi |
| 2005/0160755 | A1 * | 7/2005 | Jeong .................. F25D 23/126 62/318 |
| 2006/0086133 | A1 | 4/2006 | Olive et al. |
| 2008/0047889 | A1 | 2/2008 | Huda |
| 2008/0156015 | A1 | 7/2008 | Meyerholtz et al. |
| 2008/0196422 | A1 | 8/2008 | Lee et al. |
| 2008/0203877 | A1 | 8/2008 | Kim et al. |
| 2008/0271475 | A1 | 11/2008 | Wuesthoff et al. |
| 2008/0307818 | A1 | 12/2008 | Min et al. |
| 2009/0261485 | A1 * | 10/2009 | Eklund ................ B01F 3/04808 261/22 |
| 2010/0126210 | A1 * | 5/2010 | Rotter .................. F25D 23/065 62/441 |
| 2012/0024003 | A1 | 2/2012 | Kim |

FOREIGN PATENT DOCUMENTS

| | | |
|---|---|---|
| KR | 10-2003-0019885 | 10/2004 |
| KR | 10-2004-0085251 | 10/2004 |
| KR | 10-2005-0051993 | 6/2005 |
| KR | 10-2006-0017336 | 2/2006 |
| KR | 10-2003-0019885 | 3/2006 |
| KR | 10-2007-0016554 | 7/2008 |

OTHER PUBLICATIONS

Non-Final Office Action issued May 1, 2014 in co-pending U.S. Appl. No. 12/659,461, 31 pages.
Final Office Action issued Dec. 19, 2013 in co-pending U.S. Appl. No. 12/659,461, 36 pages.
Office Action issued Jun. 7, 2013 in co-pending U.S. Appl. No. 12/659,461, 35 pages.
U.S. Appl. No. 12/659,461, filed Mar. 9, 2010, Jae Hoon Lim et al., Samsung Electronics Co., Ltd.
U.S. Appl. No. 14/570,905, filed Dec. 15, 2014, Jae Hoon Lim et al., Samsung Electronics Co., Ltd.

* cited by examiner

REFRIGERATOR

CROSS-REFERENCE TO RELATED APPLICATIONS

This application is a continuation of and claims priority to U.S. application Ser. No. 14/570,905 filed Dec. 15, 2014, which is a Continuation application of application Ser. No. 12/659,461 filed Mar. 9, 2010, and claims the benefit of Korean Patent Application No. 10-2009-0020227, filed on Mar. 10, 2009 in the Korean Intellectual Property Office, and Korean Patent Application No. 10-2010-0016952 filed on Feb. 25, 2010, in the Korean Intellectual Property Office, the disclosures of which are incorporated herein by reference.

BACKGROUND

1. Field

Embodiments of the present invention relate to a refrigerator including a water purifying unit to supply purified water into a dispenser and/or icemaker.

2. Description of the Related Art

In general, a refrigerator is an appliance designed to supply low-temperature cold air into a storage compartment in which food is stored, thus keeping the food fresh at a low temperature. The refrigerator includes a freezing compartment in which food is kept at a freezing temperature or lower, and a refrigerating compartment in which food is kept at a temperature slightly above the freezing temperature.

Recently, a variety of large-scale refrigerators have been brought to market in consideration of convenience and need for additional storage space. Examples of these refrigerators include, e.g., a general type refrigerator in which a freezing compartment is defined in an upper region thereof, a double door type refrigerator in which a freezing compartment is defined in a left or right region thereof, and a combined type refrigerator in which a freezing compartment is defined in a lower region thereof.

Some of the above-mentioned refrigerators include a dispenser to discharge beverages from a front side of a door, or an icemaker to make ice within a storage compartment.

These refrigerators conventionally include a water supply system to supply water to the dispenser provided at the front side of the door or the icemaker within a freezing compartment, a water purifying filer to purify the water to be supplied, and a water tank in which the purified water is stored.

The water purifying filter and water tank are separated from each other. The water tank is mainly provided in the rear of a refrigerating compartment, and the water purifying filter is provided in one side of an upper region of the refrigerating compartment.

Accordingly, a storage compartment of conventional refrigerators may include a space for installation of the water purifying filter and water tank. This results in deterioration in space utility of the storage compartment and makes it difficult for a user to access the water purifying filter upon replacement thereof.

Further, a heater may be provided to prevent the water tank provided in the rear of the refrigerating compartment from freezing due to cold air, resulting in increased manufacturing costs.

Furthermore, when the water supply system is provided independently of the water purifying filter and water tank, a water supply pipe connected therebetween has an increased length and thus, the water supply system has a complicated configuration.

SUMMARY

Therefore, it is an aspect of the present invention to provide a refrigerator including a water purifying unit, which may assure effective use of a storage space and simplified configuration of a water supply system provided in the refrigerator.

It is another aspect of the present invention to provide a refrigerator including a water purifying unit, which may assure easy replacement of a filter provided in the water purifying unit, resulting in enhanced user convenience and reliability of a water supply system upon replacement of the filter.

Additional aspects of the invention will be set forth in part in the description which follows and, in part, will be apparent from the description, or may be learned by practice of the invention.

The foregoing and/or other aspects of the present invention are achieved by providing a refrigerator including a body defining a storage compartment, a drawer type storage container provided in the storage compartment to be pulled out of the storage compartment, and a water purifying unit including a case and a filter unit provided in the case and serving to purify water supplied from a water supply source, and the water purifying unit is provided between the storage container and one sidewall of the storage compartment.

The drawer type storage container may be formed in one side surface thereof with a receiving recess to receive the water supply unit therein.

The filter unit may include a filter assembly to be pushed into or pulled out of the case, and a valve assembly to control supply of water to the filter assembly based on whether the filter assembly is pushed in or pulled out.

The filter assembly may be separably coupled to the valve assembly.

The case may include a filter receiving region for insertion of the filter assembly upon separation or coupling thereof, and an entrance of the filter receiving space is exposed from the storage container.

The filter assembly may include a plug to be inserted into the valve assembly and a coupling protrusion formed at an outer peripheral surface of the plug, and the valve assembly may include a socket into which the plug is inserted and a holding protrusion formed at an inner peripheral surface of the socket and configured to be caught and supported by the coupling protrusion when the plug is inserted into and is rotated in the socket.

The valve assembly may include a valve housing having an inlet path and an outlet path and a valve unit reciprocally movably provided in the valve housing, and a bypass path may be defined in the valve housing to communicate the inlet path and the outlet path with each other as the valve unit is moved upon separation of the filter assembly.

The water purifying unit may further include a water tank unit in which the water purified by the filter unit is stored.

The filter unit may include a filter assembly to be pushed into or pulled out of the case, and a valve assembly to control supply of water to the filter assembly and/or the water tank unit based on whether the filter assembly is pushed in or pulled out.

The filter unit may include an inlet path through which the water supplied from the water supply source is introduced, and an outlet path through which the water introduced through the inlet path is discharged after being purified, and the outlet path may communicate with an inlet hole of the water tank unit through which the purified water is introduced.

The water purifying unit may further include an inlet pipe through which the water is supplied into the filter unit, and an outlet pipe through which the purified water is discharged from the water tank unit, and connector units coupling the inlet pipe and the outlet pipe may be provided at one side of a rear wall of the storage compartment.

The refrigerator may further include a door to open or close the storage compartment, a dispenser provided at the door, and a water supply system to supply the water to the dispenser, and the water supply system may include a first water supply pipe to connect the water supply source and the filter unit to each other, and a second water supply pipe to connect the water tank unit and the dispenser to each other.

The storage compartment may be divided into an upper refrigerating compartment and a lower freezing compartment by a horizontal partition, and the drawer type storage container may be located under a storage container cover provided in a lower region of the refrigerating compartment.

The foregoing and/or other aspects of the present invention are achieved by providing a refrigerator including a body including an upper refrigerating compartment and a lower freezing compartment, a plurality of drawer-type storage containers provided in the refrigerating compartment to be pulled out of the refrigerating compartment, and a water purifying unit including a case, and a filter unit provided in the case and to purify water supplied from a water supply source, and the water purifying unit being provided in a space between the plurality of drawer type storage containers.

The plurality of drawer type storage containers may be located under a storage container cover provided in a lower region of the refrigerating compartment, and the water purifying unit may function as a separating wall to separate the plurality of storage containers from each other under the storage container cover.

The water purifying unit may be provided in the center of a receiving space under the storage container cover, and the plurality of drawer type storage containers may be provided respectively in left and right spaces divided by the water purifying unit.

The case may be provided at both side surfaces thereof with guide rails to guide entrance and exit of the storage containers.

The water purifying unit may further include a water tank unit in which the water purified by the filter unit is stored.

The water purifying unit may further include a connecting pipe to connect an outlet path, through which the water purified by the filter unit is discharged, to an inlet hole of the water tank unit.

The filter unit may include a filter assembly containing a filter, and a valve assembly to which the filter assembly is separably coupled.

The valve assembly may supply the water supplied from the water supply source to the filter assembly when the filter assembly is coupled to the valve assembly, and may supply the water supplied from the water supply source to the water tank unit when the filter assembly is separated from the valve assembly.

The water purifying unit may further include an inlet pipe through which the water is supplied into the filter unit, and an outlet pipe through which the purified water is discharged from the water tank unit, and connector units coupling of the inlet pipe and the outlet pipe may be provided at one side of a rear wall of the refrigerating compartment.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION OF EMBODIMENTS

Figure 1:
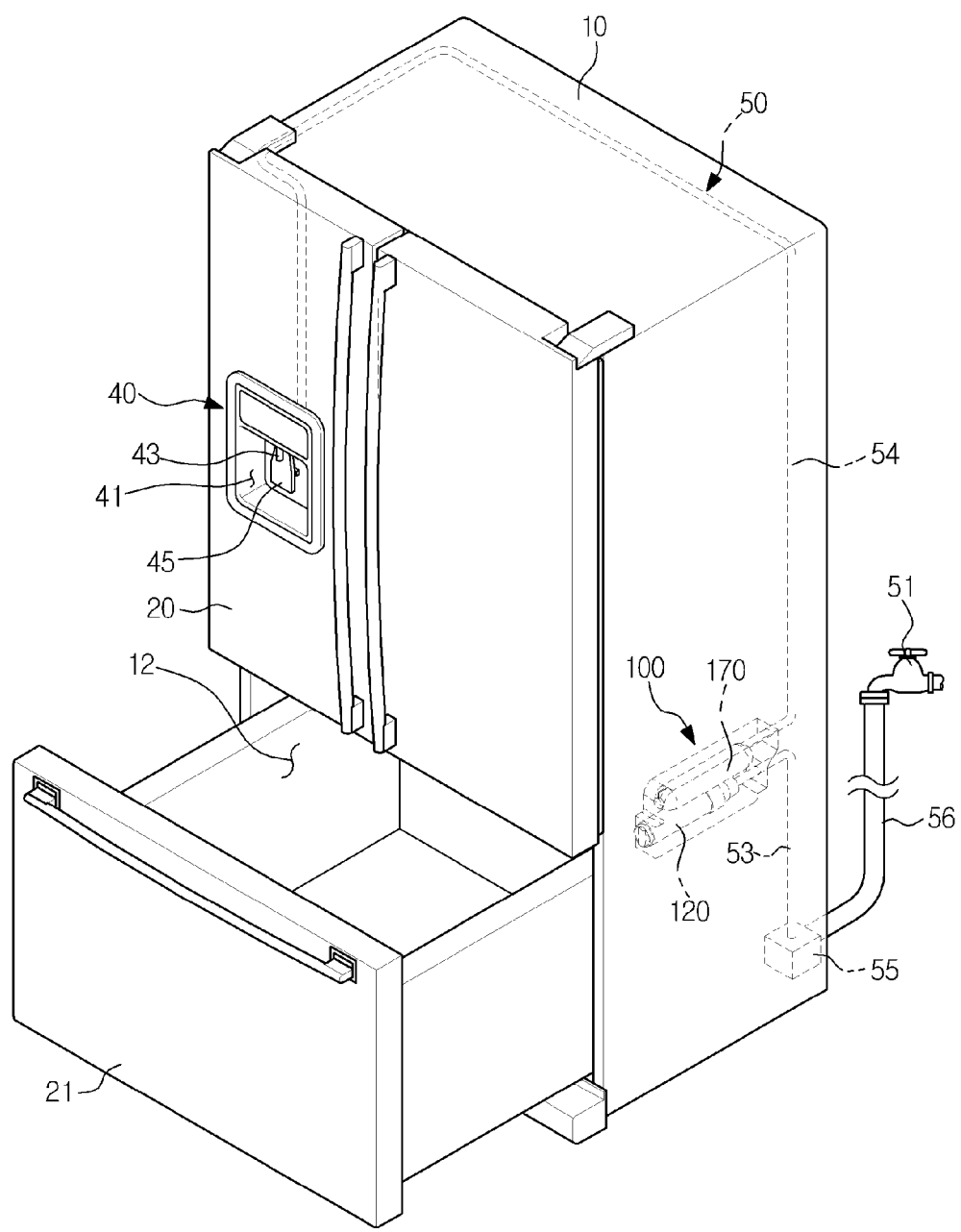
FIG. 1 is a perspective view illustrating an external appearance of a refrigerator according to one embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

Figure 2:
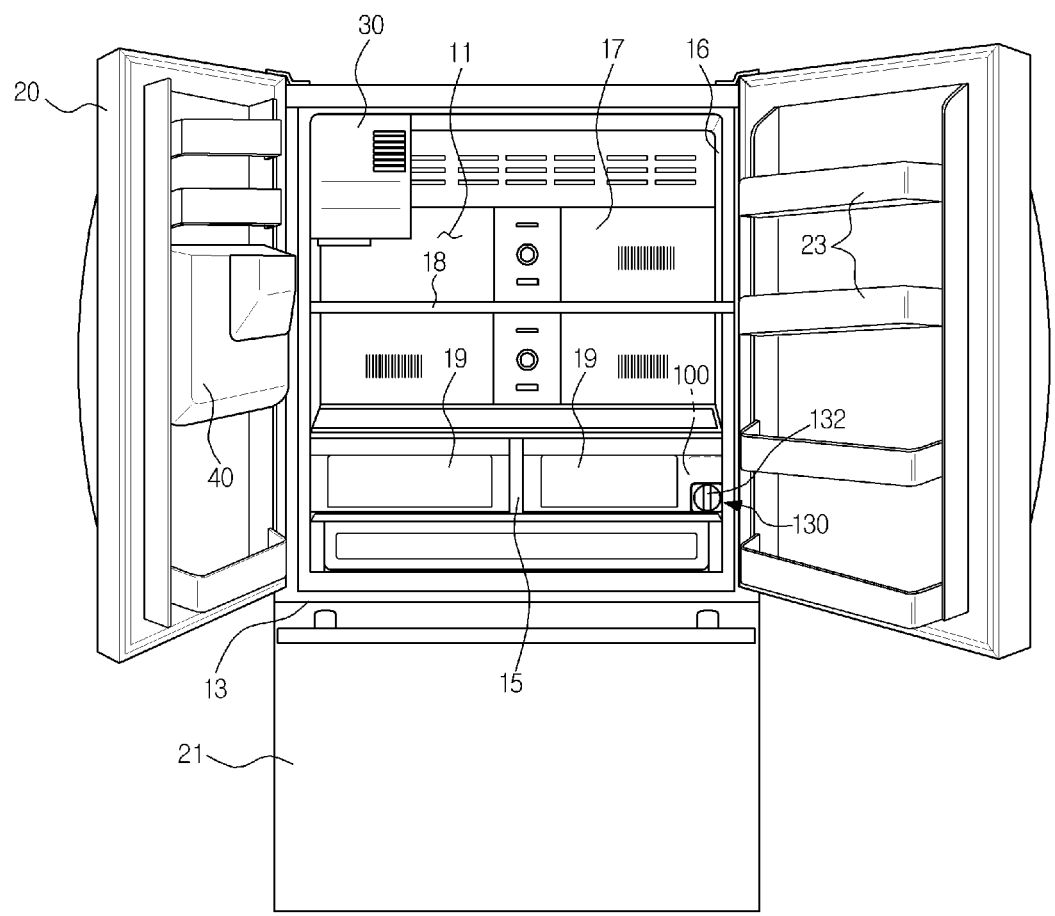
FIG. 2 is a perspective view illustrating an open state of a refrigerating compartment of the refrigerator according to the embodiment of FIG. 1.

FIG. 1 is a perspective view illustrating a schematic external appearance of a refrigerator according to one embodiment of the present invention, and FIG. 2 is a perspective view illustrating an open state of a refrigerating compartment of the refrigerator according to the embodiment.

As shown in FIGS. 1 and 2, the refrigerator according to the embodiment of the present invention includes a body 10, storage compartments 11 and 12 defined separately in upper and lower regions of the body 10 and each having an open front side, and doors 20 and 21 to open or close the open front side of the respective storage compartments 11 and 12.

The storage compartments 11 and 12 are upper and lower compartments separated from each other by a horizontal partition 13. The upper compartment serves as a refrigerating compartment 11 for refrigeration storage of food, and the lower compartment serves as a freezing compartment 12 to store food at freezing temperatures.

The refrigerating compartment 11 is provided in an upper region thereof with a shelf 18 on which food is placed and also, in a lower region thereof, with a drawer type storage container 19 in which food sensitive to moisture, such as vegetables, etc., is received.

The drawer type storage container 19 has an open upper side for entrance and exit of food. The drawer type storage container 19 is supported by guide rails 14 (see FIG. 6) provided at sidewalls 16 of the refrigerating compartment 11, to be pulled out or pushed into the refrigerating compartment 11.

A plurality of the drawer type storage containers 19 may be provided based on food receiving spaces. In the present embodiment, as shown in FIG. 2, two drawer type storage containers 19 may be provided in left and right spaces divided by a separating wall 15 in the lower region of the refrigerating compartment 11, to be slidably pulled out or pushed into the refrigerating compartment 11.

An ice-making unit 30 may be provided in one side of the upper region of the refrigerating compartment 11. The ice-making unit 30 may be installed in a space confined by an insulating wall.

The doors 20 and 21 include refrigerating compartment doors 20 to open or close the refrigerating compartment 11, and a freezing compartment door 21 to open or close the freezing compartment 12.

The freezing compartment door 21 is of a drawer type and opens or closes the freezing compartment 12 via sliding movement thereof. The refrigerating compartment doors 20 are a pair of doors hingedly coupled to left and right sides of the body 10.

The refrigerating compartment doors 20 are provided with a plurality of door guards 23 in which articles, such as beverages, are received. Also, one of the refrigerating compartment doors 20 is provided with a dispenser 40 to allow a user to discharge purified water from the outside.

The dispenser 40, as shown in FIG. 1, includes a water discharge space 41 indented rearward from a front surface of the refrigerating compartment door 20 by a predetermined depth. A water discharge hole 43 is located at the top of the water discharge space 41.

The water discharge space 41 is provided with an operating lever 45 to initiate a water discharge operation.

In addition, a water supply system 50 to supply water to the water discharge hole 43 is provided in the body 10 and the refrigerating compartment door 20.

The water supply system 50 includes water supply pipes 53 and 54 to guide water supplied from an external water supply source 51 to the water discharge hole 43, a water supply valve 55 to control the supply of water, and a water purifying unit 100. The water purifying unit 100 includes a filter unit 120 and a water tank unit 170 for purification and storage of the supplied water.

One side of the water supply valve 55 is connected to the water supply source 51 via a connecting pipe 56, and the other side is connected to the filter unit 120 of the water purifying unit 100 via the first water supply pipe 53. The water tank unit 170 of the water purifying unit 100 is connected to the water discharge hole 43 via the second water supply pipe 54.

Figure 3:
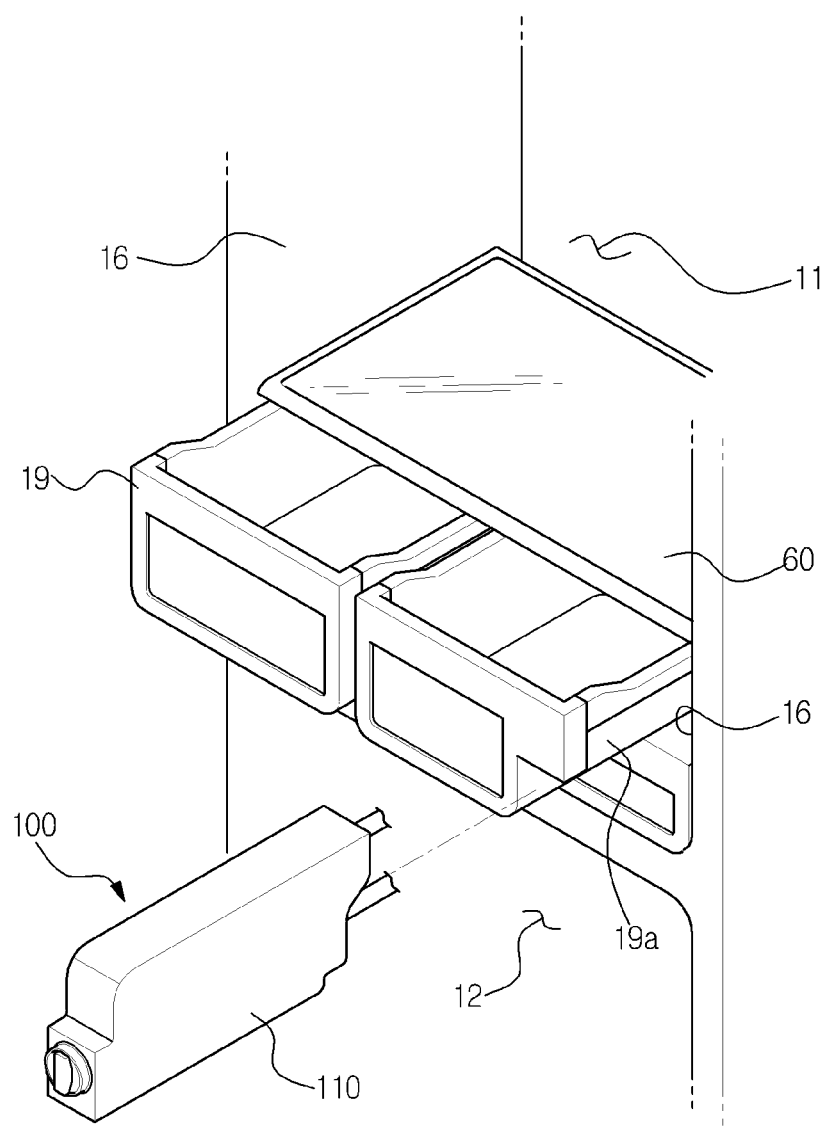
FIG. 3 is a partial perspective view of the refrigerator according to the embodiment of FIG. 1.

For utility of an interior space of the refrigerating compartment 11, the water purifying unit 100, as shown in FIG. 3, may be located between the storage container 19 provided in the lower region of the refrigerating compartment 11 and one sidewall 16 of the refrigerating compartment 11.

The storage container 19 is located under a storage container cover 60 provided in the lower region of the refrigerating compartment 11. The storage container cover 60 is supported by both the sidewalls 16 of the refrigerating compartment 11 to divide the interior space of the refrigerating compartment 11, thus providing a food storage space thereabove while shielding the open upper side of the storage container 19 therebelow.

The above-described storage container cover 60 may be partially made of a transparent material to enable confirmation of food received in the storage container 19.

One side surface of the storage container 19 adjacent to one sidewall 16 of the refrigerating compartment 11 is formed with a receiving recess 19a to receive the water purifying unit 100 therein.

The receiving recess 19a has a shape corresponding to a contour of the water purifying unit 100. Thus, when the water purifying unit 100 is provided between the storage container 19 and one sidewall 16 of the refrigerating compartment 11, the water purifying unit 100 is disposed in contact with the receiving recess 19a.

The above-described configuration may prevent a reduction in a storage space of the refrigerating compartment 11 caused when the filter unit 120 and the water tank unit 170 are installed separately. In the present embodiment, since the water purifying unit 100 is provided in a useless space between the storage container 19 and one sidewall 16 of the refrigerating compartment 11 and a case 110 of the water purifying unit 100 is surrounded by the storage container 19, the refrigerating compartment 11 has enhanced space utility and superior external appearance.

Although the present embodiment illustrates the receiving recess 19a in which the water purifying unit 100 is received as being formed in the storage container 19, the receiving recess 19a may naturally be formed in one sidewall 16 of the refrigerating compartment 11, or formed in both the sidewall 16 of the refrigerating compartment 11 and the storage container 19.

Also, although the present embodiment illustrates the water purifying unit 100, in the case 110 of which the filter unit 120 and the water tank unit 170 are received, as being provided between the storage container 19 and one sidewall 16 of the refrigerating compartment 11, only the filter unit 120 may naturally be provided in the case 110.

If the water purifying unit 100 having the water tank unit 170 is provided between the storage container 19 and one sidewall 16 of the refrigerating compartment 11, there is a reduced possibility of water stored in a water tank freezing due to cold air as compared to an assumption that the water tank is installed to a rear wall 17 of the refrigerating compartment 11. Therefore, a heater to prevent freezing of water stored in the water tank may be unnecessary.

Also, if the filter unit 120 and the water tank unit 170 are integrally provided in the water purifying unit 100, a more significantly simplified assembly configuration of the water supply system 50 may be accomplished as compared to a conventional configuration wherein a filter unit and a water tank unit are installed separately.

Figure 7:
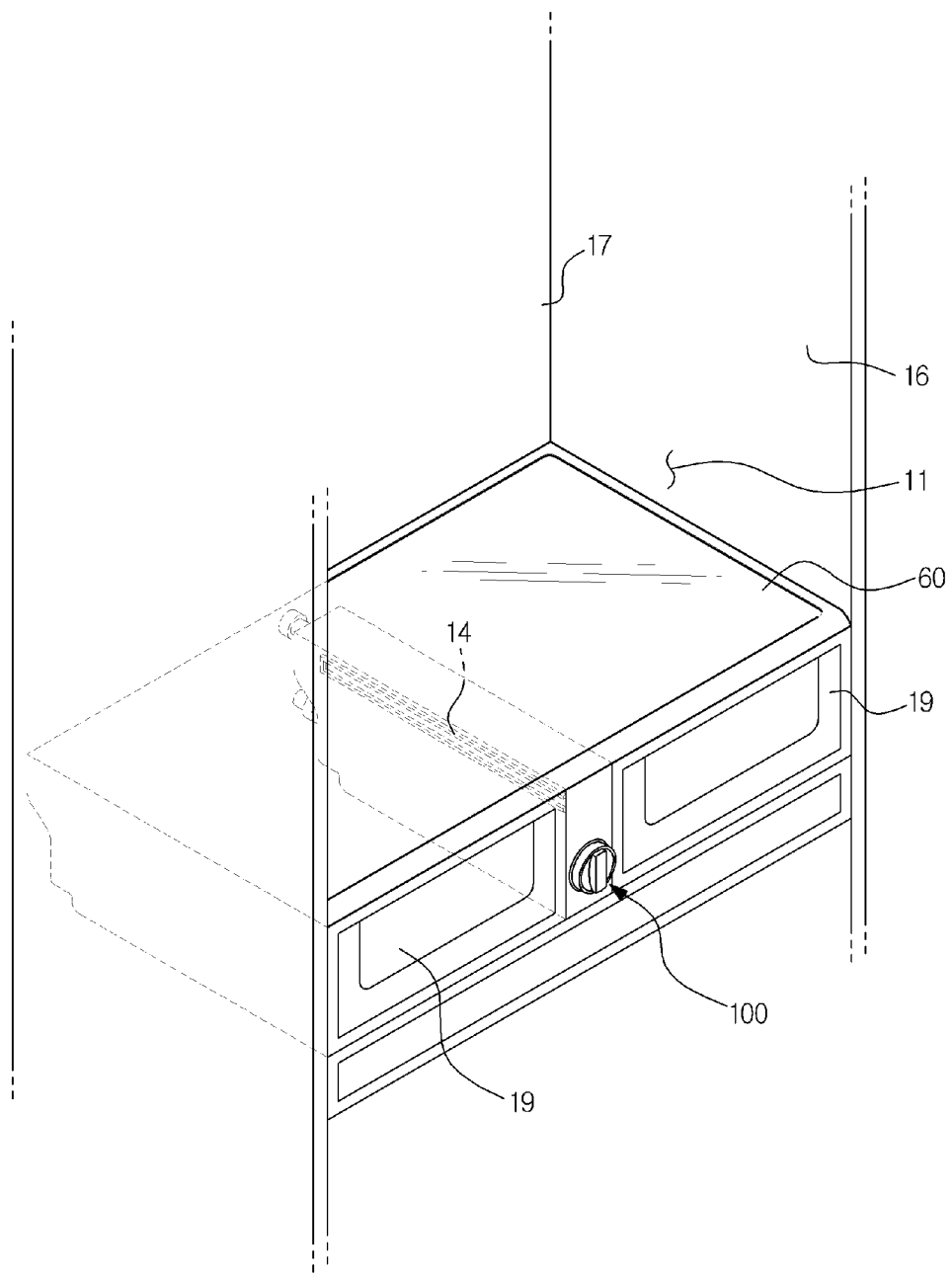
FIG. 7 is a view illustrating an installation configuration of the water purifying unit of the refrigerator according to another embodiment of the present invention.
Figure 8:
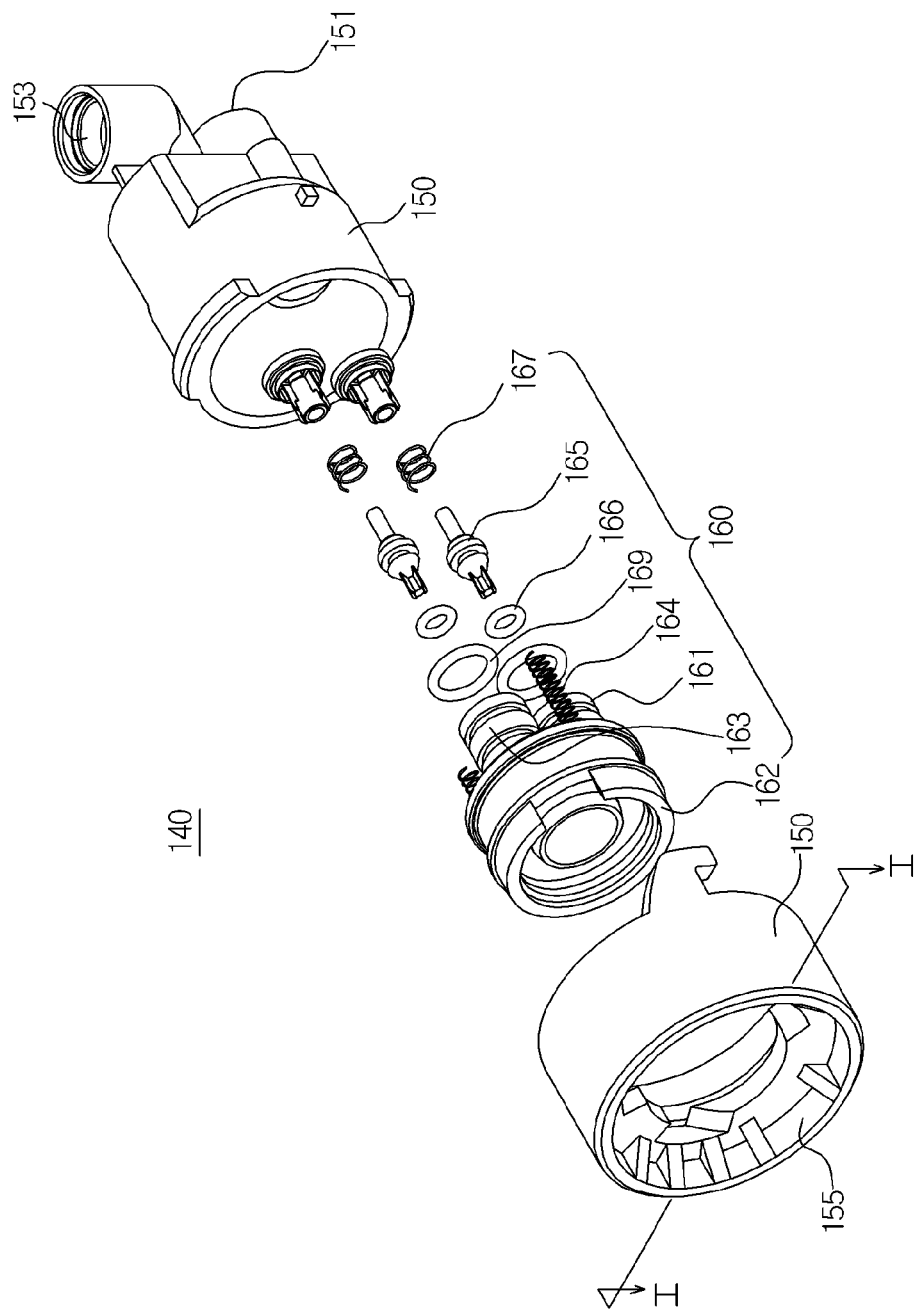
FIG. 8 is an exploded perspective view illustrating a valve assembly of a water purifying unit provided in a refrigerator according to another embodiment of the present invention.
Figure 9:
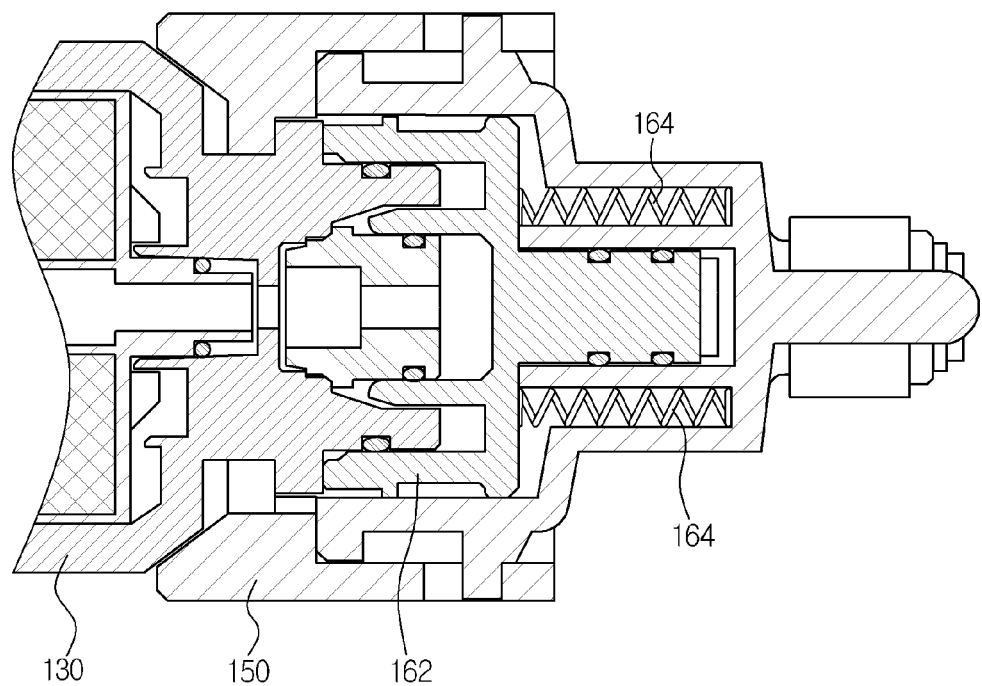
FIG. 9 is a sectional view taken along the line I-I of FIG. 8.
Figure 10:
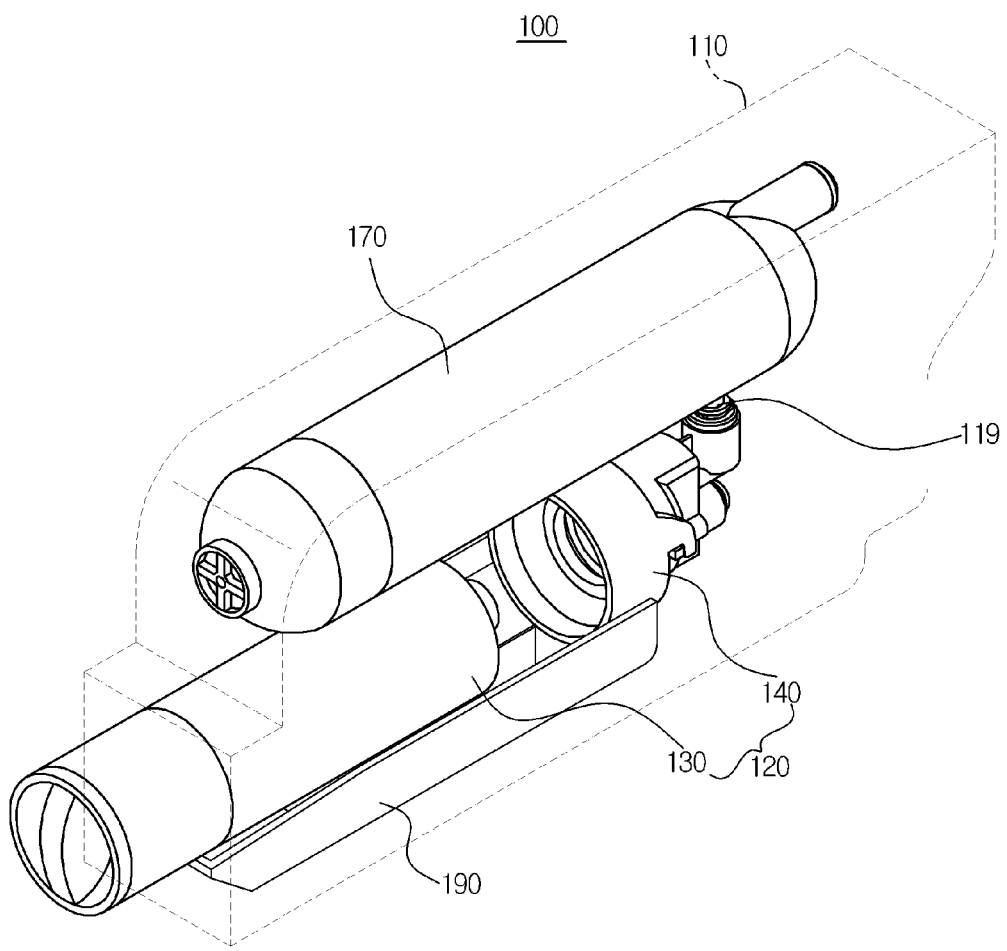
FIG. 10 is a perspective view illustrating a water purifying unit of a refrigerator according to a further embodiment of the present invention.
Figure 11:
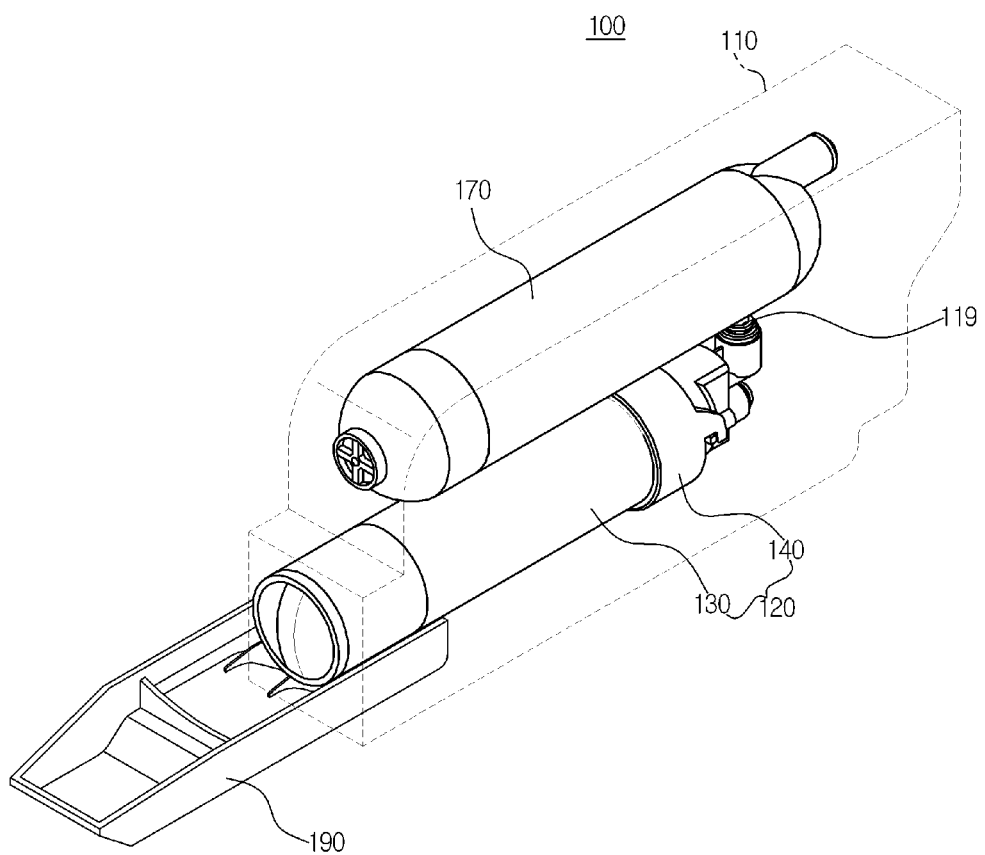
FIG. 11 is a perspective view illustrating a pulled out state of a water sump member of FIG. 10.

Although the refrigerator according to the embodiment of the present embodiment includes the water purifying unit 100 provided between the storage container 19 and one sidewall 16 of the refrigerating compartment 11, the refrigerator is not limited thereto. As shown in FIG. 7, if the storage containers 19 are provided respectively at left and right sides of the separating wall (15, see FIG. 2), the function of the separating wall 15 may be replaced by the water purifying unit 100.

Specifically, the water purifying unit 100 may be provided in the center of a receiving space under the storage container cover 60, in which the storage containers 19 are received, thus serving to divide the receiving space into left and right spaces and allowing the respective storage containers 19 to be pulled out or pushed into the divided left and right spaces.

Accordingly, a useless space of the separating wall 15 used to separate the plurality of storage containers 19 from each other is replaced by the water purifying unit 100, resulting in a further enhancement in space utility.

In this case, the guide rails 14 to guide entrance and exit of the storage containers 19 may be provided at both side surfaces of the water purifying unit 100 provided in the plurality of storage containers 19.

Figure 4:
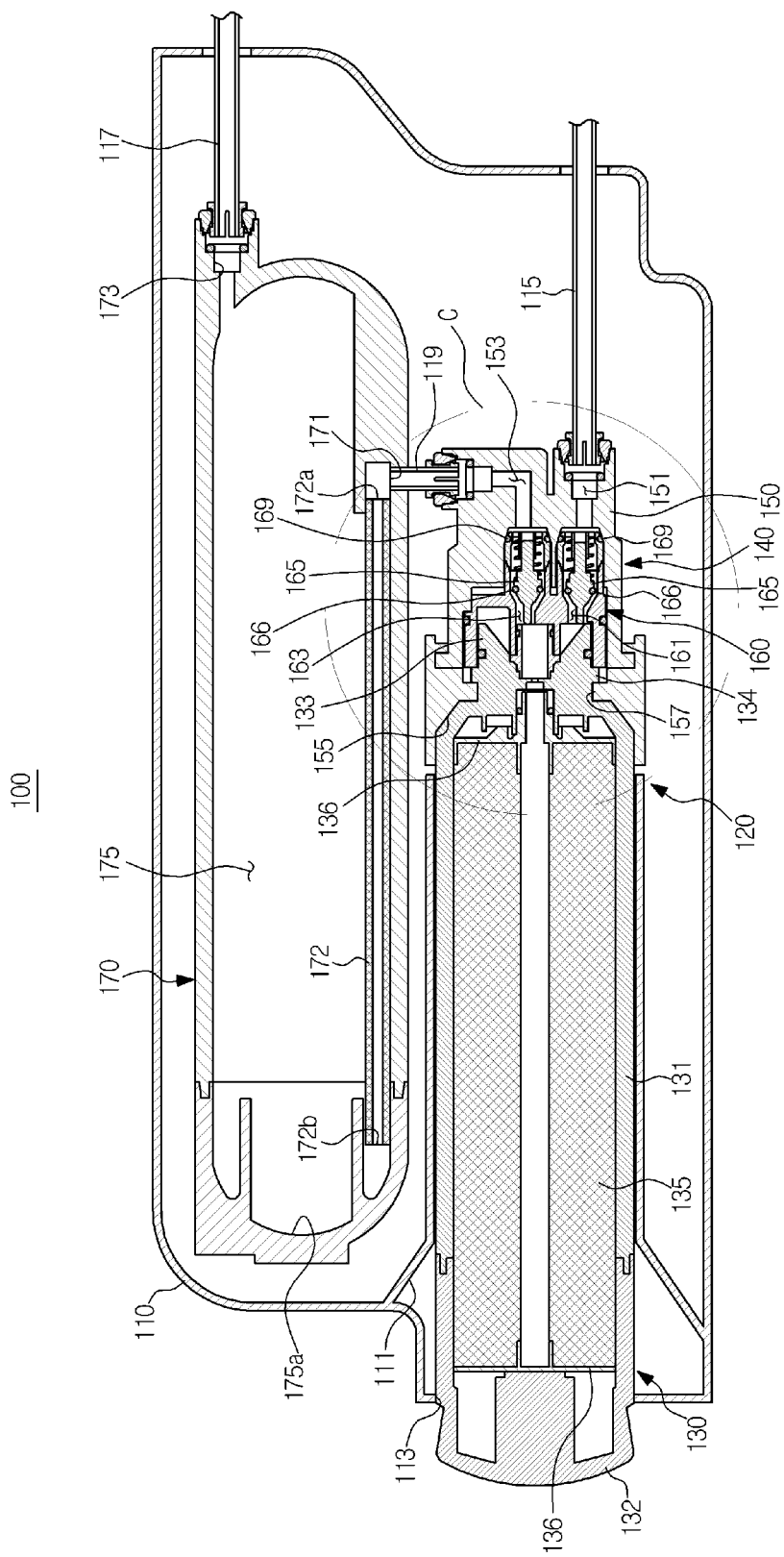
FIG. 4 is a sectional view schematically illustrating a water purifying unit of the refrigerator according to the embodiment of FIG. 1.
Figure 5:
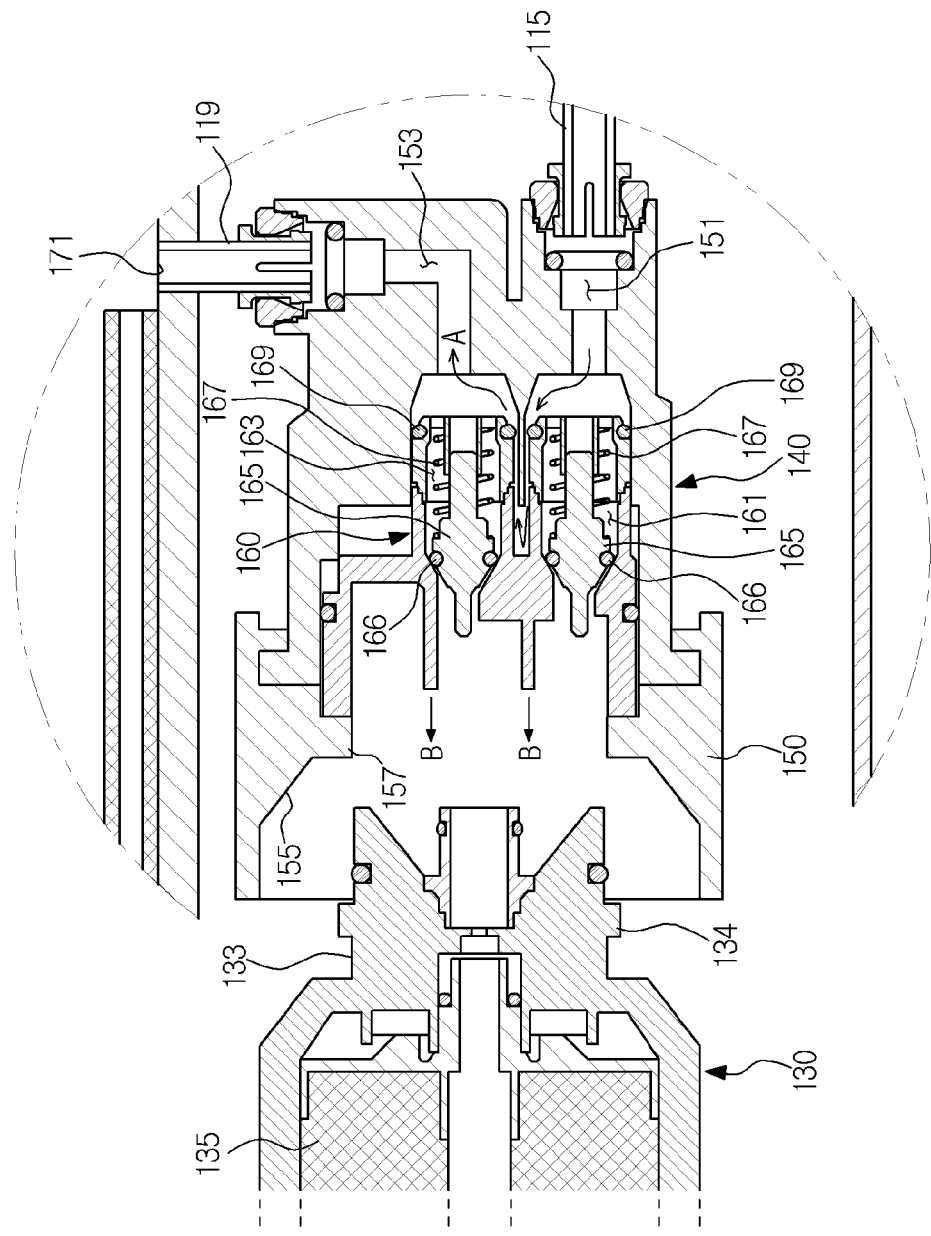
FIG. 5 is an enlarged view of the portion 'C' of FIG. 4, illustrating a filter assembly separated from a valve assembly of a filter unit of FIG. 1.

FIG. 4 is a sectional view schematically illustrating the water purifying unit of the refrigerator according to the embodiment, and FIG. 5 is an enlarged view of the portion 'C' of FIG. 4, illustrating a filter assembly separated from a valve assembly of the filter unit.

Referring to FIG. 4, the water purifying unit 100 includes the case 110, the filter unit 120 to purify water supplied from the external water supply source 51, and the water tank unit 170 in which the water purified by the filter unit 120 is stored.

The filter unit 120 and the water tank unit 170 are received respectively in the case 110. Although the present embodiment illustrates the water tank unit 170 as being located above the filter unit 120 in the case 110, the water tank unit 170 may naturally be located under the filter unit 120.

The filter unit 120 includes a filter assembly 130 to be pushed into or pulled out of the case 110, and a valve assembly 140 to control the supply of water to both the filter assembly 130 and the water tank unit 170 based on whether the filter assembly 130 is pushed in or pulled out.

Specifically, when the filter assembly 130 is pushed into the case 110 to thereby be coupled to the valve assembly 140, the valve assembly 140 supplies the water supplied from the water supply source 51 to the filter assembly 130. When the filter assembly 130 is pulled out of the case 110 to thereby be separated from the valve assembly 140, the valve assembly 140 supplies the water supplied from the water supply source 51 to the water tank unit 170.

The filter assembly 130 includes a filter housing 131 and a filter 135 received in the filter housing 131.

The filter housing 131 takes the form of a cylinder having an open end. The filter 135, both sides of which are supported by caps 136, is inserted into the filter housing 131 through the open end of the filter housing 131. A handle 132 is fitted into the open end of the filter housing 131 to close the open end of the filter housing 131.

The other end of the filter housing 131 is provided with a plug 133 and in turn, the plug 133 is inserted into the valve assembly 140. The plug 133 is formed at an outer peripheral surface thereof with coupling protrusions 134 coupling the valve assembly 140.

The valve assembly 140 includes a valve housing 150 and a valve unit 160 reciprocally movably provided in the valve housing 150, the valve unit 160 to control the supply of water to the filter assembly 130 and/or the water tank unit 170.

The valve housing 150 is formed in one side thereof with an inlet path 151 for introduction of the water supplied from the water supply source 51 and an outlet path 153 for discharge of the water purified by the filter unit 120. In addition, the other side of the valve housing 150 is provided with a socket 155, into which the plug 133 of the filter assembly 130 is inserted.

The inlet path 151 is connected to the first water supply pipe 53 through an inlet pipe 115 and thus, the water supplied from the water supply source 51 is introduced into the inlet path 151 through the first water supply pipe 53.

The socket 155 is formed at an inner peripheral surface thereof with holding protrusions 157 to be caught and supported by the coupling protrusions 134 of the plug 133 when the plug 133 is inserted into the socket 155 and is rotated by 90 degrees.

Figure 6:
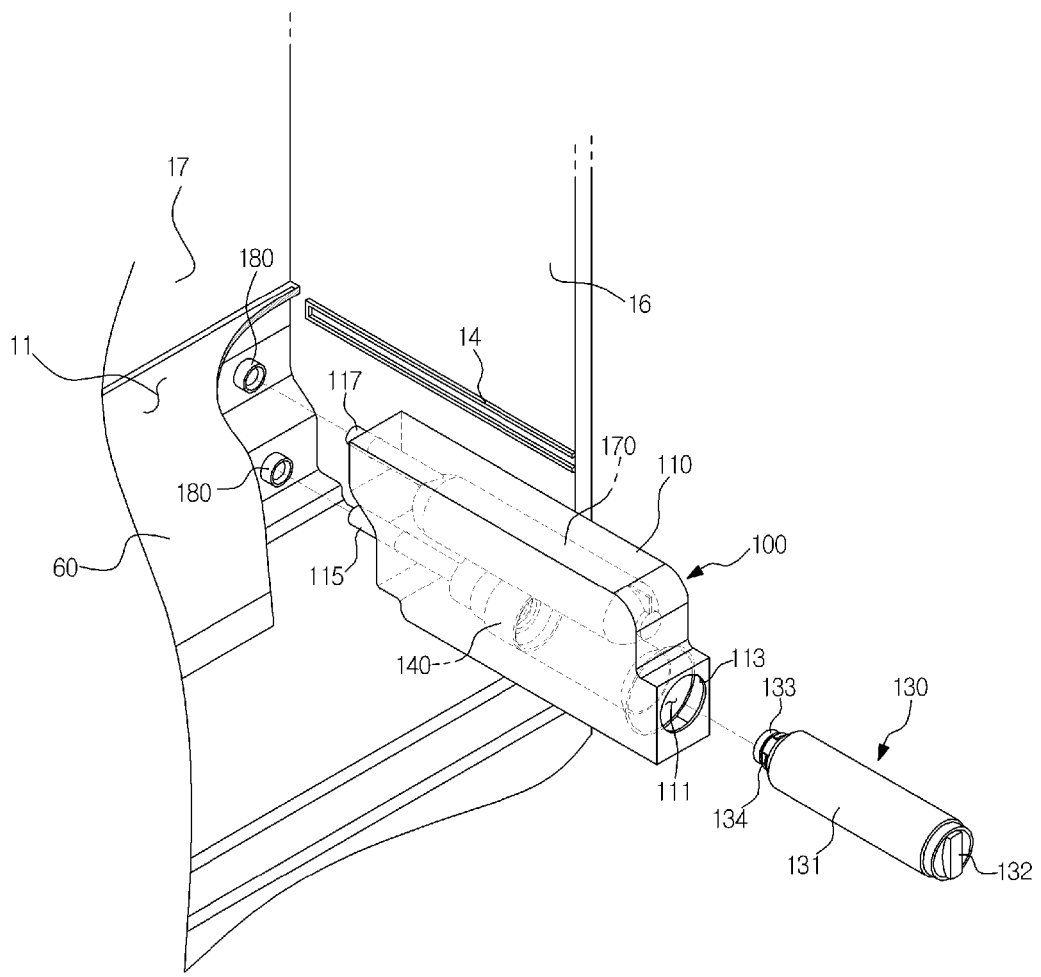
FIG. 6 is a view illustrating a configuration to install the water purifying unit into the refrigerating compartment according to the embodiment of FIG. 1.

With the above-described configuration, as shown in FIG. 6, if the handle 132 is rotated in a given direction by 90 degrees after the filter assembly 130 is inserted into a filter receiving region 111 of the case 110, the coupling protrusions 134 of the filter assembly 130 are caught and supported by the holding protrusions 157 of the valve assembly 140, completing the installation of the filter assembly 130. Upon replacement of the filter assembly 130, the filter assembly 130 is separable from the case 110 as the handle 132 is pulled out after being rotated in an opposite direction.

Although the present embodiment illustrates the coupling protrusions 134 and holding protrusions 157 as elements to couple or separate the filter assembly 130 to or from the valve assembly 140, this is given only by way of example, and other known elements, such as, e.g., latches or hooks, may be provided.

Under the assumption that the water purifying unit 100 according to the present embodiment is provided between the storage container 19 and one sidewall 16 of the storage compartment 11, as shown in FIG. 3, the case 110 of the water purifying unit 100 is surrounded by the storage container 19 so as not to be exposed to the outside. However, an entrance (113, see FIG. 6) of the filter receiving region 111 defined in the case 110 is exposed from the storage container 19 to allow the filter assembly 130 to be pushed in or pulled out.

Specifically, when the filter assembly 130 is inserted into the filter receiving region 111 of the filter housing 131, only the handle 132 of the filter assembly 130 is exposed when viewed from the front of the refrigerating compartment 11, resulting in an improved external appearance.

With the above-described configuration, moreover, the user may access the filter assembly 130 for replacement thereof more easily than in a conventional filter provided in the upper region of the refrigerating compartment 11, resulting in enhanced user convenience.

The valve assembly 140, as shown in FIG. 5, has a bypass path A to prevent leakage of water from the valve housing 150 upon separation of the filter assembly 130. The bypass path A is created by the valve unit 160 reciprocally movably provided in the valve housing 150.

Specifically, when the filter assembly 130 is separated from the valve assembly 140, a first communicating path 161 and a second communicating path 163 are closed respectively by shutter members 165. Here, the first communicating path 161 communicates the inlet path 151 and the filter assembly 130 with each other, and the second communicating path 163 communicates the outlet path 153 and the filter assembly 130 with each other.

More specifically, as the shutter members 165 are pressed toward the filter assembly 130 by elastic members 167, the first and second communicating paths 161 and 163 are closed respectively by first sealing members 166 provided at outer peripheral surfaces of the shutter members 165. Also, as the valve unit 160 is moved leftward in a direction represented by the arrows B under the influence of a pressure of the water introduced through the inlet path 151, the bypass path A for communication between the inlet path 151 and the outlet path 153 is created.

On the other hand, when the filter assembly 130 is coupled to the valve assembly 140, as shown in FIG. 4, the filter assembly 130 presses the valve unit 160 and the shutter members 165, thus causing the bypass path A to be closed by second sealing members 169 while opening the first and second communicating paths 161 and 163.

With the above-described configuration, even if the water supply system 50 is operated during replacement of the filter assembly 130, it may effectively prevent water from being supplied to the filter assembly 130 and consequently, prevent deterioration in the operational reliability of the water supply system 50 due to water leakage.

The water tank unit 170 includes an inlet hole 171 for introduction of the purified water, a water storage space 175 in which the purified water introduced through the inlet hole 171 is stored, and an outlet hole 173, through which the purified water stored in the water storage space 175 is discharged to be supplied to the ice-making unit 30 and/or the dispenser 40.

The inlet hole 171 of the water tank unit 170 communicates with the outlet path 153 of the filter unit 120 through a connecting pipe 119, and the outlet hole 173 is connected to the second water supply pipe 54 through an outlet pipe 117.

The water storage chamber 175 of the water tank unit 170 may be provided with a guidance pipe 172 to guide the water, having passed through the inlet hole 171, into the water storage chamber 175.

The guidance pipe 172 has an entrance 172a that communicates with the inlet hole 171 and an exit 172b that communicates with the water storage chamber 175. The exit 172b communicating with the water storage chamber 175 may be located at an opposite side of the outlet hole 173 through which the water stored in the water storage chamber 175 is discharged.

With this configuration, the water introduced through the inlet hole 171 begins to be stored in the water storage chamber 175 starting from a front surface 175a of the water storage chamber 175. Accordingly, as the water is stored in the water storage chamber 175 and is cooled by cold air supplied into the storage compartment, the cooled water near the outlet hole 173 may be supplied into the ice-making unit 30 and the dispenser 40. In conclusion, only the cooled water of the water stored in the water storage chamber 175 may be supplied into the ice-making unit 30 and the dispenser 40 through the outlet hole 173.

The front surface 175a of the water storage chamber 175 is arranged facing the exit 172b of the guidance pipe 172 from which the water is discharged into the water storage chamber 175 and thus, may be curved to disperse a pressure of the water discharged thereto.

Accordingly, it may be possible to prevent damage to the water tank unit 170 due to the pressure of water discharged from the exit 172b of the guidance pipe 172 arranged facing the front surface 175a of the water storage chamber 175.

Although the present embodiment illustrates the outlet path 153 of the filter unit 120 as communicating with the inlet hole 171 of the water tank unit 170 for a reduction in the length of a water supply pipe, the purified water discharged through the outlet path 153 of the filter unit 120 may also be introduced into the water supply valve 55 (see FIG. 1), such that the purified water is supplied into the water tank unit 170 after a supply amount of the purified water is regulated by the water supply valve 55.

FIG. 6 is a view illustrating a configuration to install the water purifying unit into the refrigerating compartment according to the embodiment.

As shown in FIG. 6, the water purifying unit 100 is installed adjacent to one sidewall 16 of the refrigerating compartment 11. For convenience of installation, connector units 180 are provided at the rear wall 17 of the refrigerating compartment 11 under the storage container cover 60 at positions respectively corresponding to the inlet pipe 115 and the outlet pipe 117 of the water purifying unit 100.

The connector units 180 are connected respectively to ends of the first and second water supply pipes 53 and 54. As the inlet pipe 115 and the outlet pipe 117 of the water purifying unit 100 are coupled to the respective connector units 180, the first and second water supply pipes 53 and 54 are connected respectively to the inlet pipe 115 and the outlet pipe 117.

The connector units 180 may take the form of, e.g., a conventional one-touch fitting unit or quick-connector, to allow the inlet pipe 115 and the outlet pipe 117 to be coupled to the connector units 180 in a one-touch operation.

The water storage chamber 175 of the water tank unit 170 may be provided with a guidance pipe 172 to guide the water, having passed through the inlet hole 171, into the water storage chamber 175.

The guidance pipe 172 has an entrance 172a that communicates with the inlet hole 171 and an exit 172b that communicates with the water storage chamber 175. The exit 172b communicating with the water storage chamber 175 may be located at an opposite side of the outlet hole 173 through which the water stored in the water storage chamber 175 is discharged.

With this configuration, the water introduced through the inlet hole 171 begins to be stored in the water storage chamber 175 starting from a front surface 175a of the water storage chamber 175. Accordingly, as the water is stored in the water storage chamber 175 and is cooled by cold air supplied into the storage compartment, the cooled water near the outlet hole 173 may be supplied into the ice-making unit 30 and the dispenser 40. In conclusion, only the cooled water of the water stored in the water storage chamber 175 may be supplied into the ice-making unit 30 and the dispenser 40 through the outlet hole 173.

The front surface 175a of the water storage chamber 175 is arranged facing the exit 172b of the guidance pipe 172 from which the water is discharged into the water storage chamber 175 and thus, may be curved to disperse a pressure of the water discharged thereto.

Accordingly, it may be possible to prevent damage to the water tank unit 170 due to the pressure of water discharged from the exit 172b of the guidance pipe 172 arranged facing the front surface 175a of the water storage chamber 175.

As is apparent from the above description, in a refrigerator according to the embodiments of the present invention, a water purifying unit is provided between a storage container and one sidewall of a storage compartment, or between a plurality of storage containers. This installation of the water purifying unit may enhance space utility of the storage compartment and also, may reduce a freezing possibility of water stored in a water tank unit. Thus, a separate heater for the water tank unit may be unnecessary, resulting in a reduction in manufacturing costs.

Further, in the refrigerator according to the embodiments of the present invention, the water purifying unit includes the water tank unit and a filter unit integrally formed with each other. This integral configuration may reduce a length of a water supply pipe and consequently, simplify assembly configuration of a water supply system.

Furthermore, the refrigerator according to the embodiments of the present invention include a detachable filter assembly, achieving easy replacement of the filter assembly and enhanced user convenience. Moreover, providing a valve assembly to prevent leakage of water during replacement of the filter assembly may enhance the operational reliability of the water supply system.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A refrigerator, comprising:
  a water tank to store water purified by a filter; and a valve assembly to be coupled to the water tank through a connecting portion having a part arranged in a direction different from a longitudinal axis of the water tank, the valve assembly being configured to be couplable to the filter and to receive water from a water supply source to be purified by the filter while the filter is coupled to the valve assembly, the valve assembly including one or more shutter members and one or more elastic members, the one or more shutter members configured to:

close a communication path through which water from the water supply source flows toward the filter while elastic force of the one or more elastic members is applied to the one or more shutter members due to decoupling of the filter from the valve assembly, open the communication path through which water from the water supply source flows toward the filter responsive to restoration of the elastic force due to coupling of the filter to the valve assembly, wherein a space is arranged inside the refrigerator to accommodate an arrangement of the water tank, the valve assembly, and the filter while the filter is coupled to the valve assembly, so that while the filter is coupled to the valve assembly, the water tank is horizontally extended along the filter, the water tank is vertically arranged with respect to the filter, and the water tank is parallel to the filter within the space, and wherein the valve assembly is couplable to the water tank.

2. The refrigerator according to claim 1, further comprising:

a holding member provided to the valve assembly and arranged to support at least a part of the filter while the filter is coupled to the valve assembly.

3. The refrigerator according to claim 1, wherein the water tank is positioned above the filter while the filter is coupled to the valve assembly.

4. The refrigerator according to claim 1, wherein an outlet of the valve assembly and an inlet of the water tank are connected by a connector line that includes a vertical portion.

5. The refrigerator according to claim 1, wherein the valve assembly comprises:

a housing having an inlet and an outlet, and a valve unit comprising the one or more shutter members and arranged to be movable within the housing, wherein the valve unit is configured to linearly move away from the inlet and the outlet while the communication path is being closed, and the valve unit is configured to linearly move toward the inlet and the outlet while the communication path is being opened.

6. The refrigerator according to claim 5, wherein the valve assembly is in a filter mode while the communication path is open, and the valve assembly is in a bypass mode while the communication path is closed.

7. The refrigerator according to claim 5, wherein the filter includes at least one coupling protrusion to be directly coupled to the valve unit, while the filter is coupled to the valve assembly.

8. The refrigerator according to claim 5, wherein the one or more elastic members are configured to apply the elastic force to the valve unit while the communication path is being opened and to restore the elastic force while the communication path is being closed.

9. The refrigerator according to claim 1, wherein the space accommodating the water tank, the valve assembly and the filter while the filter is coupled to the valve assembly is provided in a refrigerated portion.

10. The refrigerator according to claim 1, wherein the water tank includes:

an inlet for receiving water into the water tank and an outlet for discharging water from the water tank, and a guidance pipe disposed in the water tank and extending from the inlet of the water tank.

* * * * *